US008651361B1

(12) United States Patent
Daroff

(10) Patent No.: US 8,651,361 B1
(45) Date of Patent: Feb. 18, 2014

(54) METHOD FOR ANGULAR OSCILLATION FRICTION WELDING TO AN AXIALLY SYMMETRIC WELD SURFACE

(71) Applicant: The Boeing Company, Chicago, IL (US)

(72) Inventor: Zachary B. Daroff, Cherry Hill, NJ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/766,106

(22) Filed: Feb. 13, 2013

(51) Int. Cl.
*B23K 20/12* (2006.01)

(52) U.S. Cl.
USPC ..................... 228/112.1; 228/114.5

(58) Field of Classification Search
None
See application file for complete search history.

(56) References Cited

U.S. PATENT DOCUMENTS

| 3,768,147 | A | * | 10/1973 | Berry et al. ................. 228/112.1 |
| 4,087,036 | A | * | 5/1978 | Corbett et al. ................. 228/102 |
| 5,518,562 | A | * | 5/1996 | Searle et al. .................. 156/73.5 |
| 5,813,593 | A | * | 9/1998 | Galaske, Jr. ................ 228/112.1 |
| 6,106,233 | A | * | 8/2000 | Walker et al. ............. 416/213 R |
| 6,524,072 | B1 | * | 2/2003 | Brownell et al. ......... 416/213 R |
| 6,595,401 | B2 | * | 7/2003 | Collot et al. ................. 228/44.3 |
| 6,834,790 | B2 | * | 12/2004 | Bagnall ...................... 228/112.1 |
| 6,840,431 | B1 | * | 1/2005 | Kim .............................. 228/203 |
| RE40,287 | E | * | 5/2008 | Tully et al. ................... 156/73.5 |
| 7,419,082 | B2 | * | 9/2008 | Brownell et al. ............... 228/2.1 |
| 2003/0223873 | A1 | * | 12/2003 | Carrier ...................... 416/213 R |
| 2004/0060966 | A1 | * | 4/2004 | Stotler et al. .................. 228/113 |
| 2004/0238594 | A1 | * | 12/2004 | Juranitch et al. ................ 228/29 |
| 2006/0266801 | A1 | * | 11/2006 | Tonks et al. .................... 228/101 |
| 2007/0152022 | A1 | * | 7/2007 | Strahm ......................... 228/114 |
| 2009/0159644 | A1 | * | 6/2009 | Nitta et al. ................. 228/114.5 |
| 2009/0185908 | A1 | * | 7/2009 | Chung et al. ............. 416/213 R |
| 2009/0249622 | A1 | * | 10/2009 | Schreiber ....................... 29/889 |
| 2012/0012644 | A1 | * | 1/2012 | Baxter et al. .................. 228/104 |
| 2012/0121397 | A1 | * | 5/2012 | Albuzat et al. ............. 415/182.1 |
| 2012/0216938 | A1 | * | 8/2012 | Johnson et al. .................. 156/64 |
| 2012/0280021 | A1 | * | 11/2012 | Stiehler et al. ............. 228/114.5 |
| 2012/0301307 | A1 | * | 11/2012 | Yang et al. ................. 416/213 R |
| 2013/0133194 | A1 | * | 5/2013 | Belmonte et al. ............... 29/888 |

FOREIGN PATENT DOCUMENTS

EP 513669 A * 11/1992
EP 624419 A * 11/1994

* cited by examiner

*Primary Examiner* — Kiley Stoner
(74) *Attorney, Agent, or Firm* — Joseph M. Rolnicki; Evans & Dixon, LLC

(57) ABSTRACT

A method of friction welding a workpiece and a component part is disclosed. The workpiece has a weld surface that is coextensive with at least a portion of a virtual surface, which is symmetric about an axis, and the component part includes a complementary surface that conforms to the weld surface. The method includes angularly oscillating the workpiece about the axis; urging the weld surface and the complementary surface together with a first predetermined force to create a plasticized region between the workpiece and the component part; urging the weld surface and the complementary surface together with a second predetermined force; discontinuing angularly oscillating the workpiece; urging the weld surface and the complementary surface together with a third predetermined force; and discontinuing to urge the weld surface and the complementary surface together when the workpiece and the component part coalesce.

22 Claims, 16 Drawing Sheets

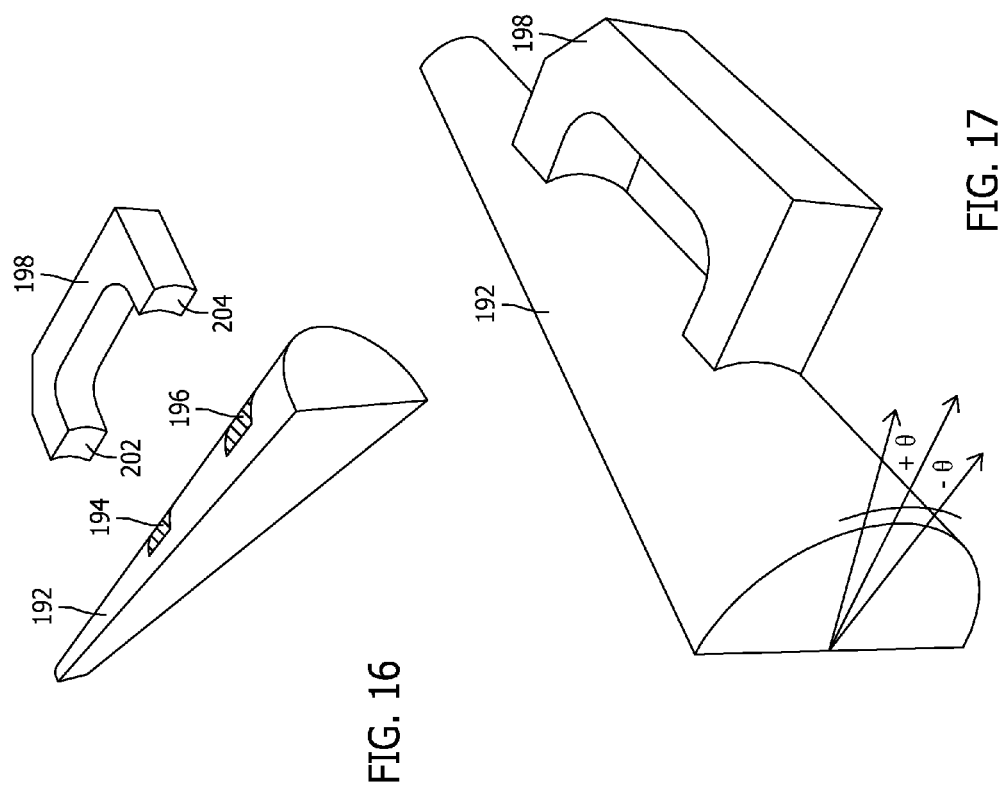

METHOD FOR ANGULAR OSCILLATION FRICTION WELDING TO AN AXIALLY SYMMETRIC WELD SURFACE

BACKGROUND

Spin, linear, and orbital friction welding techniques are well-known solid-state welding processes for joining component parts. However, the spin friction welding process is limited in that it can only be used for joining parts whose faying surfaces are parallel during the welding operation. Even though linear and orbital friction welding processes may not be similarly constrained, they require more complex and expensive machinery than does spin friction welding. More significantly, with linear and orbital friction welding methods, the welding surface of the workpiece may have no geometric variation along the axis of oscillation, making welding of components having non-uniform shapes difficult.

SUMMARY

The method of friction welding a component part to a workpiece provided by the method of the invention overcomes the limitations associated with spin welding and linear reciprocating friction welding described above. This is accomplished by the inventive method of angular oscillation friction welding a complementary surface of a component part to an axially symmetric weld surface of a workpiece.

One aspect of the present disclosure relates to a method of joining a workpiece and at least one component part. The workpiece has a weld surface that is coextensive with at least a portion of a virtual surface that is symmetric about an axis, and each of the at least one component part includes a complementary surface that conforms to the weld surface. The method includes angularly oscillating the workpiece about the axis; urging the weld surface and the complementary surface together with a first predetermined force for a first predetermined time to create a region of a plasticized material between the workpiece and the at least one component part; urging the weld surface and the complementary surface together with a second predetermined force for a second predetermined time, wherein the second predetermined force is greater than the first predetermined force; discontinuing angularly oscillating the workpiece; urging the weld surface and the complementary surface together with a third predetermined force for a third predetermined time; and discontinuing to urge the weld surface and the complementary surface when the plasticized material consolidates and the workpiece and at least one complement part coalesce.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIG. 16 is a representation of an initial step of a still further embodiment according to one aspect of the disclosure.

FIG. 17 is a representation of a method step following that of FIG. 16.

DESCRIPTION

Figure 1:
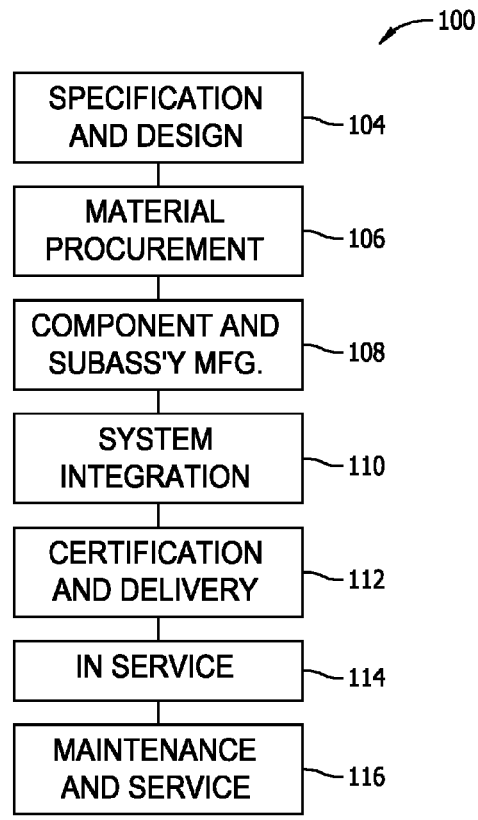
FIG. 1 is a flow diagram of aircraft production and service methodology.
Figure 2:
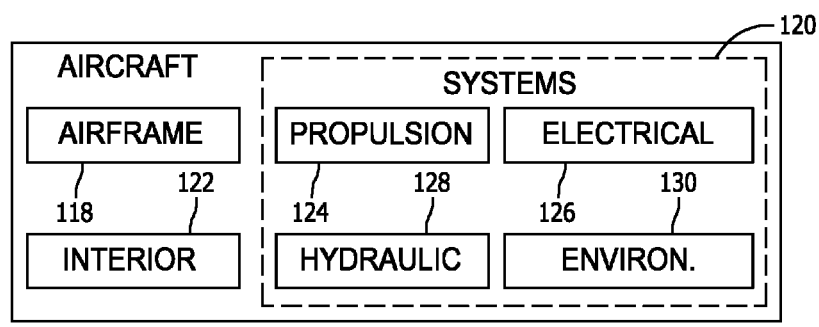
FIG. 2 is a block diagram of an aircraft.
Figure 3A:
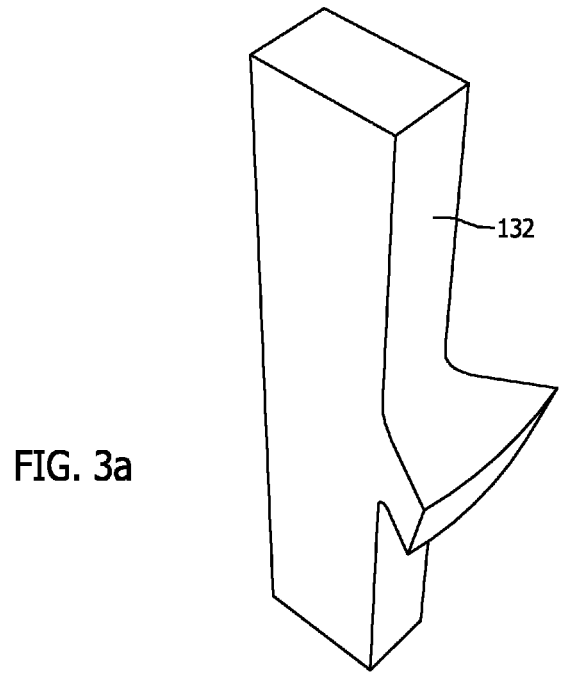
FIGS. 3a, 3b and 3c are perspective views from different angles of a representation of a workpiece employed in the method according to one aspect of the disclosure.
Figure 3B:
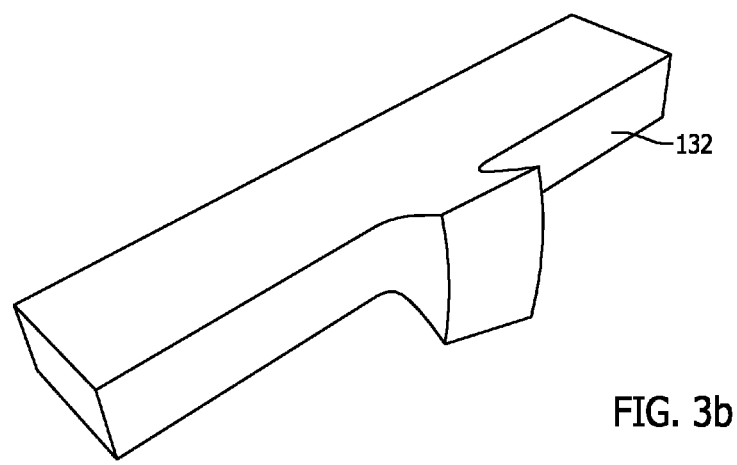
Figure 3C:
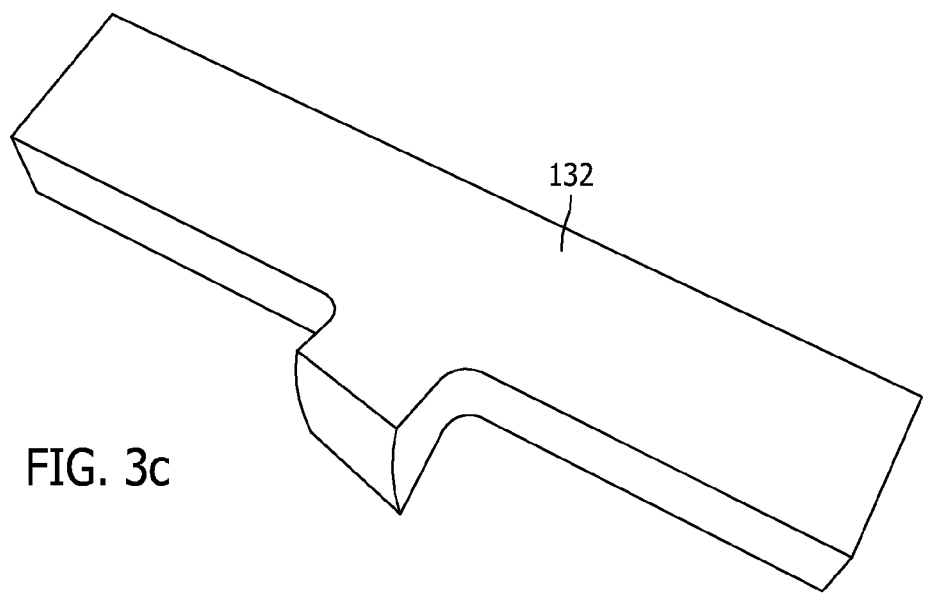

Referring more particularly to the drawings, examples of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 102 produced by exemplary method 100 may include an airframe 118 with a plurality of systems 120 and an interior 122. Examples of high-level systems 120 include one or more of a propulsion system 124, an electrical system 126, a hydraulic system 126, and an environmental system 130. Any number of other systems may be included. Although an aerospace example is shown, the principles of the invention may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus examples, method examples, or a combination thereof may be utilized while the aircraft 102 is in service, for example and without limitation, to maintenance and service 116.

FIGS. 3-13 and FIG. 22 represent a basic application of the method of angular oscillation friction welding according to one or more aspects of the disclosure. In FIGS. 3-13 the method is practiced on a workpiece 132 and a component part 134. The workpiece 132 and component part 134 shown are constructed of metal, although not necessarily the same type of metal. It is also not necessary that the workpiece 132 and the component part 134 have the configurations shown in FIGS. 3-13, or that they have solid constructions. The method according to one or more aspects of the disclosure can be employed with a workpiece and one or more component parts that have exterior surfaces that are not symmetric about an axis. The method according to one or more aspects of the disclosure could also be employed with a workpiece and one or more component parts that do not have solid constructions and have hollow interiors.

Figure 4:
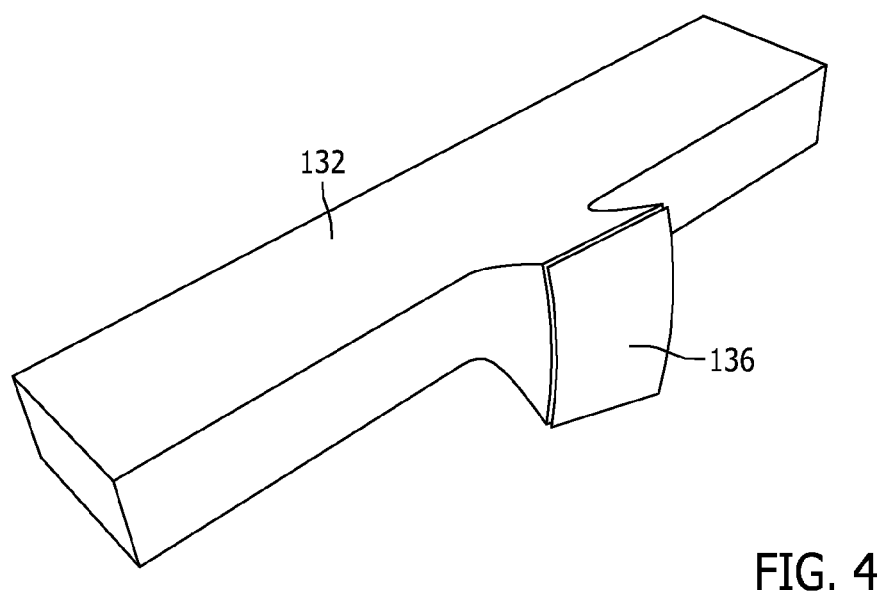
FIG. 4 is a perspective view of the workpiece and the weld surface of the workpiece.
Figure 5:
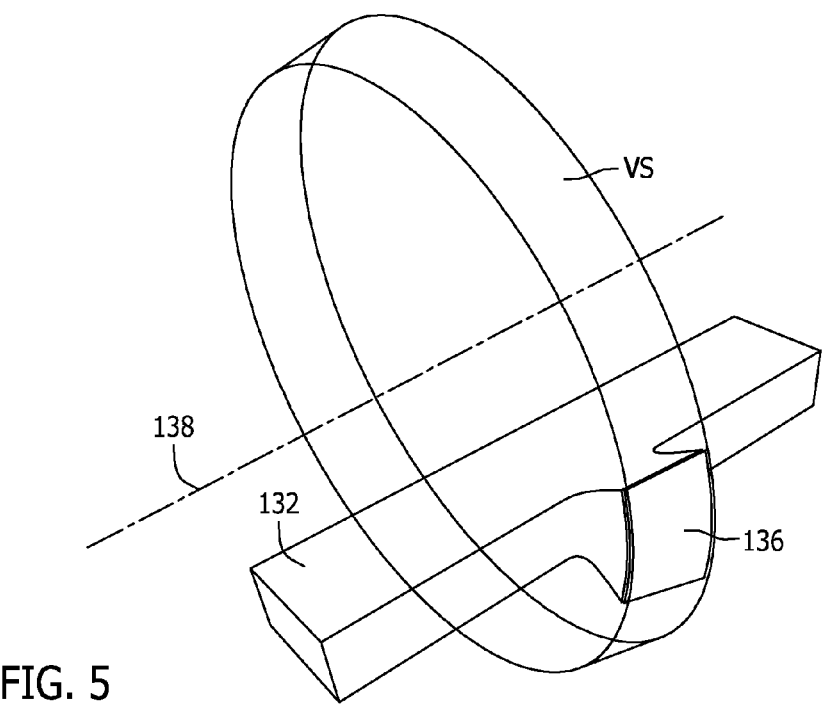
FIG. 5 is a perspective view of the workpiece with a representation of a virtual rotationally symmetric surface of the workpiece.
Figure 6:
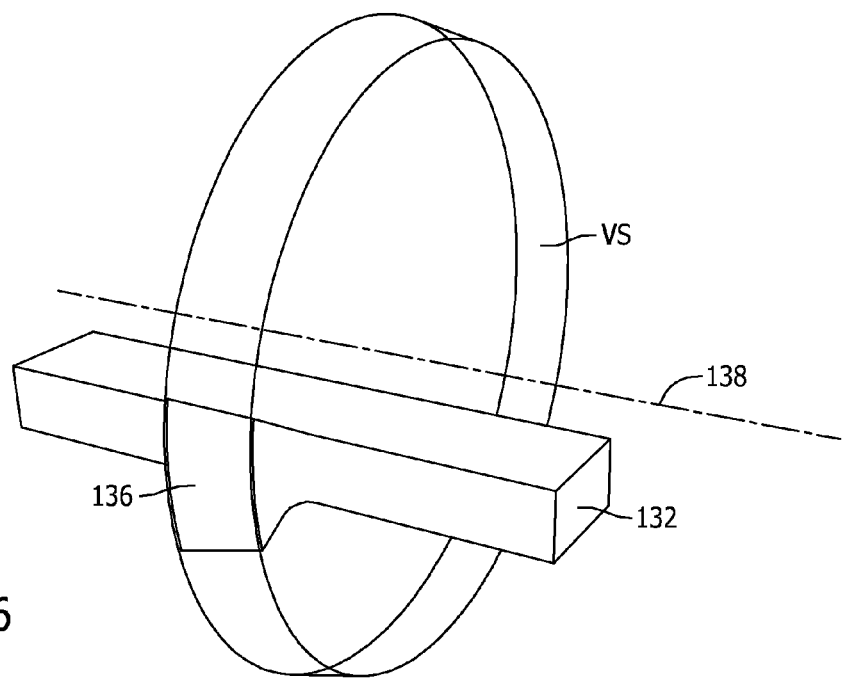
FIG. 6 is a representation similar to that of FIG. 5 from an opposite end of the workpiece.

Referring now to FIG. 4, in a pre-weld machining operation on the workpiece 132, the workpiece is provided with a weld surface 136 on its exterior surface. In other examples of the method, the workpiece could have an existing portion of its exterior surface that could function as the weld surface and no pre-weld machining of the workpiece would be needed. As represented in FIGS. 5 and 6, the weld surface 136 is coextensive with at least a portion of a virtual surface VS, symmetric about an axis 138, which is the axis about which the weld surface 136 is to be oscillated. The workpiece 132 could have a longitudinal length and a lateral width, and the axis 138 could extend longitudinally relative to the workpiece or laterally relative to the workpiece. The weld surface 136 is only a portion of the exterior surface of the workpiece and the entire exterior surface may or may not be symmetric about the axis 138. It is only necessary for the method according to one or more aspects of the disclosure that the weld surface 136 be symmetric about the axis 138. Additionally, it is not necessary that the weld surface 136 of the workpiece 132 be formed in an intermediate portion of the workpiece 132 as shown in FIGS. 3-13. The workpiece weld surface 136 could also be provided at an end of the workpiece if desired.

Figure 7:
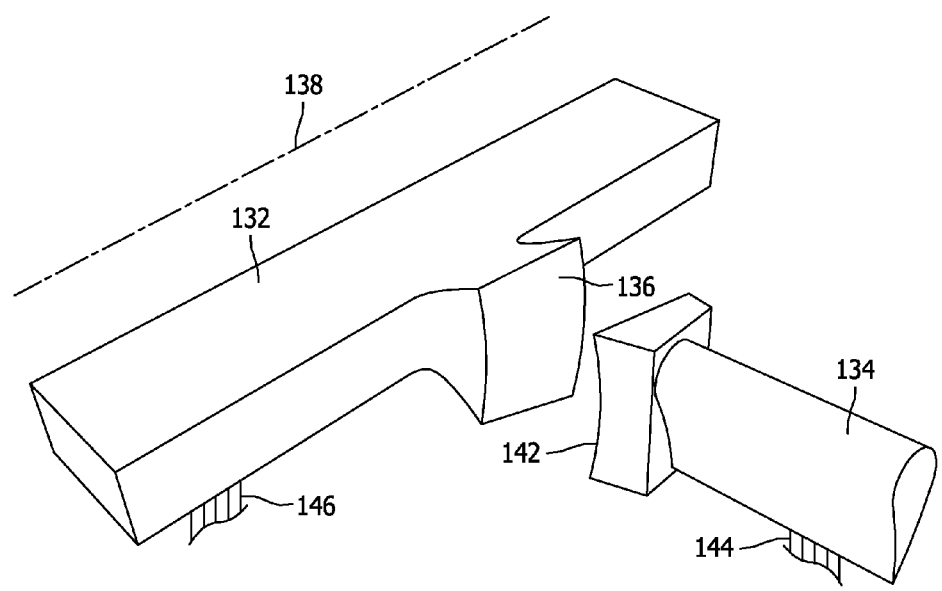
FIG. 7 is a representation of an initial step in the method according to one aspect of the disclosure.
Figure 8:
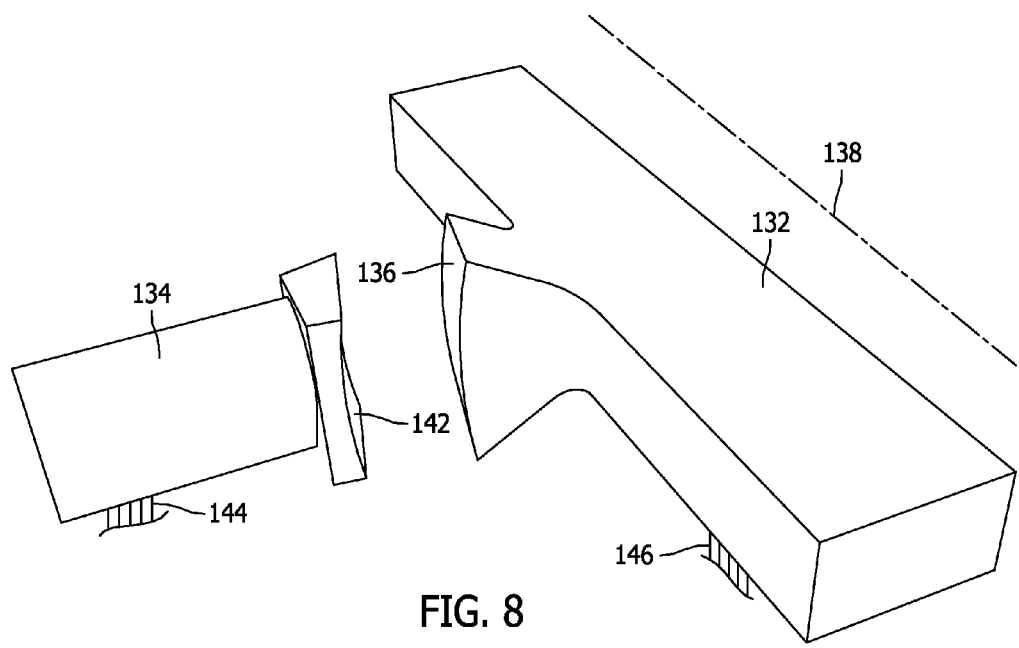
FIG. 8 is a representation similar to that of FIG. 7 from an opposite end of the workpiece.

A pre-weld machining operation may also be performed on the component part 134, illustrated, e.g., in FIG. 7. The machining operation provides the component part 134 with a complementary surface 142 on a portion of the component part as shown in FIGS. 7 and 8. The complementary surface 142 has a shape that substantially conforms to and will fit in surface engagement with the workpiece weld surface 136. In other words, surfaces 136 and 142 have substantially complementary shapes. In other examples of the method, the component part 134 could have an existing portion of its exterior surface that could function as the complementary surface 142 and no pre-weld machining of the component part would be needed. The complementary surface 142 shown in FIGS. 7 and 8 contains no enclosed opening and is a solid surface. In other embodiments the complementary surface 142 could include an enclosed opening, for example where the component part 134 is hollow and has a generally annular cross-section (e.g., an ellipsoid or a polygonal cross section). Examples of enclosed openings are represented by the dashed lines on the component part complementary surfaces 172, 174, 176 shown in FIG. 14. The complementary surface 142 shown on the end of the component part 134 in FIGS. 7 and 8 is only one example of where the complementary surface 142 could be positioned on the component part. The complementary surface could also be provided on some intermediate portion of the component part length, so long as the complementary surface has a shape that substantially conforms to and will fit in surface engagement with the workpiece weld surface 136.

With the pre-weld machining operations, if any, on the workpiece 132 and component part 134 completed, the workpiece 132 and the component part 134 are positioned relative to each other in the orientations desired for final assembly. In FIGS. 7 and 8, the workpiece 132 and component part 134 are positioned relative to each other with the workpiece weld surface 136 opposing the complementary surface 142 of the component part 134. In the example of FIGS. 7 and 8 the component part 134 is generally perpendicular to the axis 138 of the weld surface 136. The angular orientation between the workpiece 132 and the component part 134 is maintained by machine tools 144, 146 that are represented schematically in FIGS. 7 and 8. The machine tool 144 operatively associated with the component part 134 holds the component part in its desired orientation relative to the workpiece 132. The machine tool 146 supporting the work piece 132 is operable to angularly oscillate the work piece weld surface 136 about the axis of symmetry 138.

Figure 9:
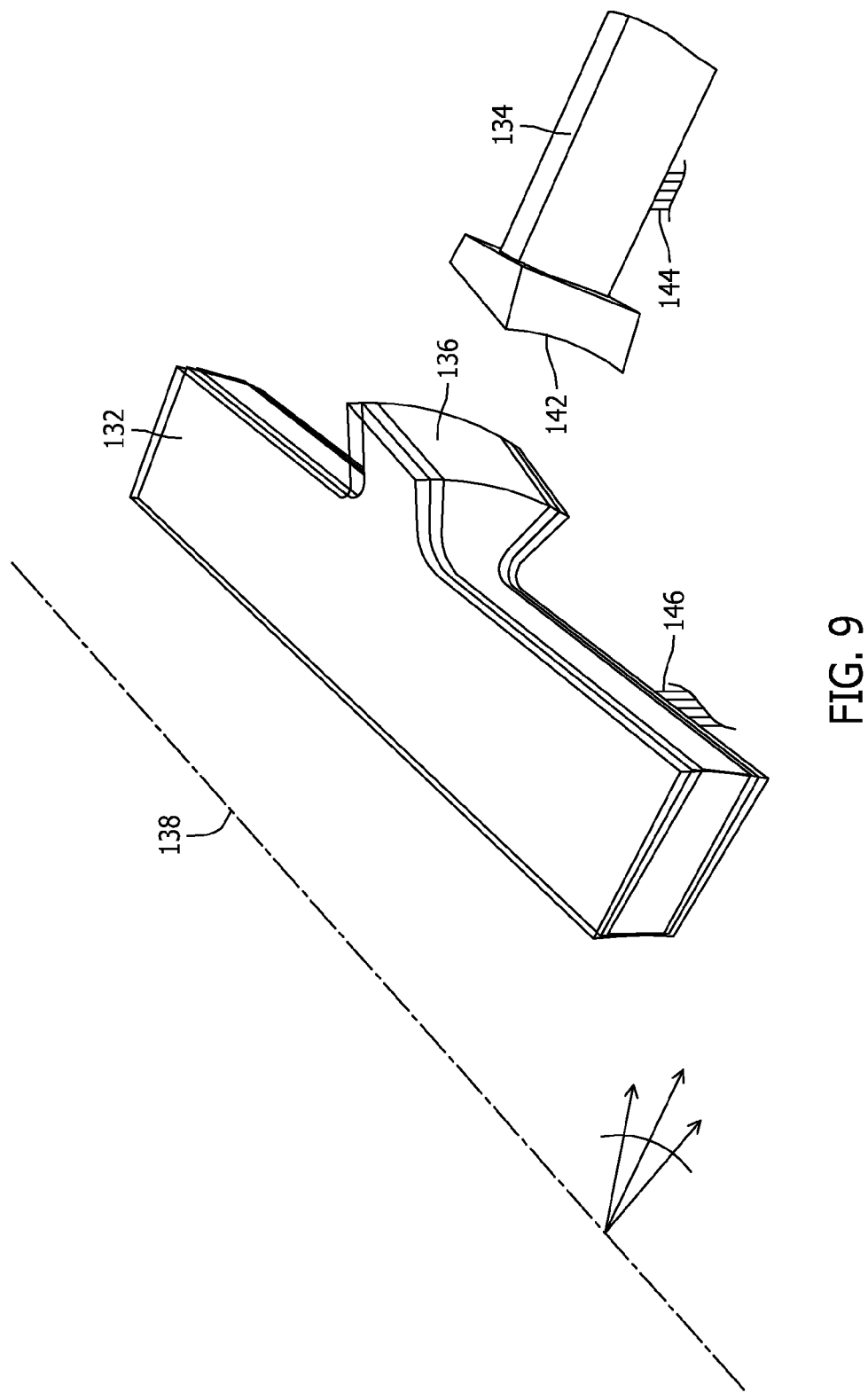
FIG. 9 is a representation of a further step of the method following that of FIGS. 7 and 8.
Figure 10:
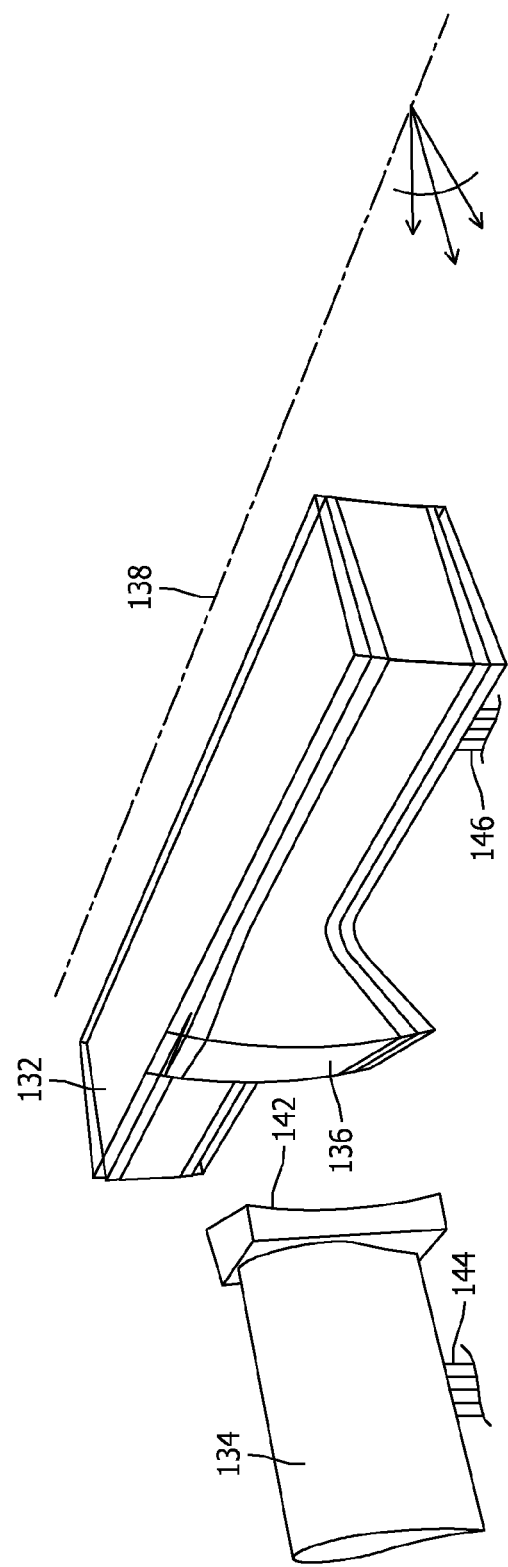
FIG. 10 is a representation similar to that of FIG. 9 from the opposite end of the workpiece.
Figure 11:
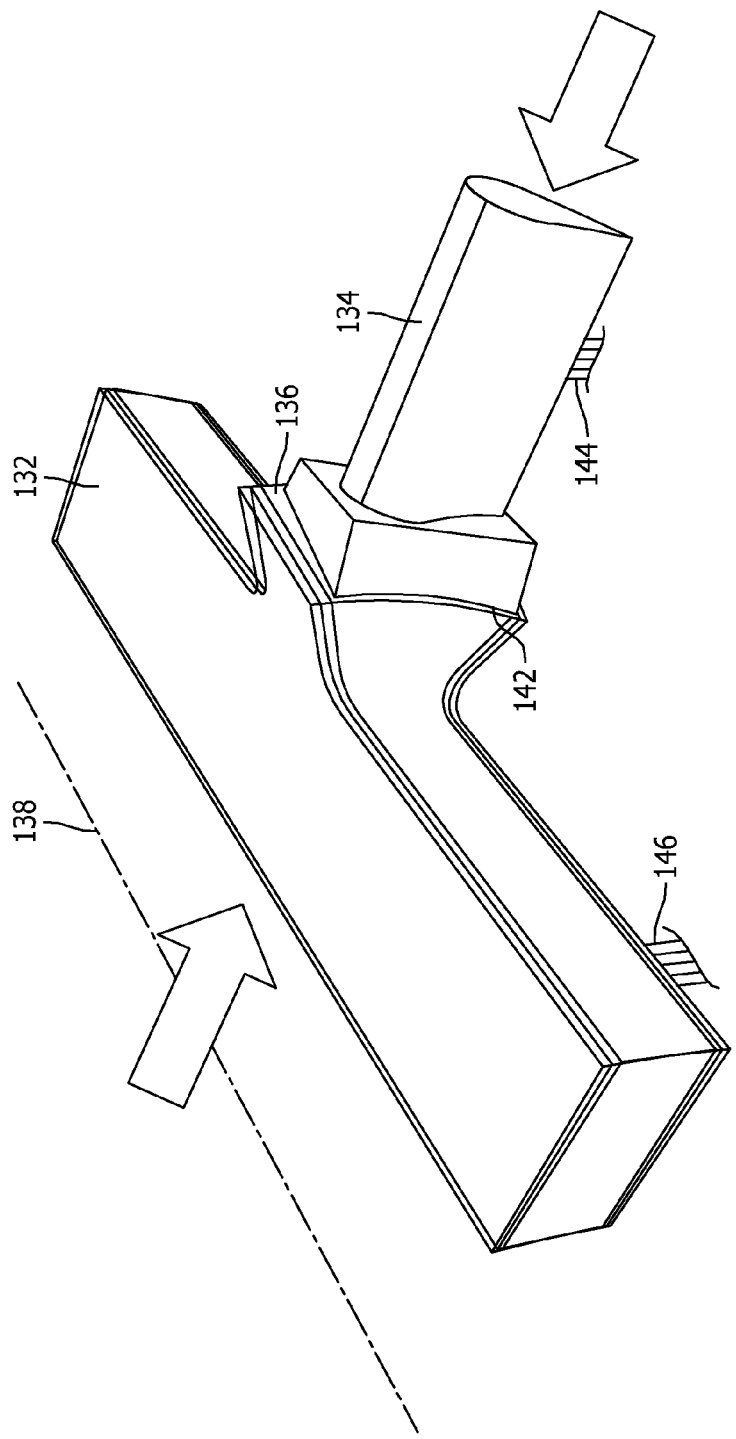
FIG. 11 is a representation of a still further step of the method following that of FIGS. 9 and 10.
Figure 12:
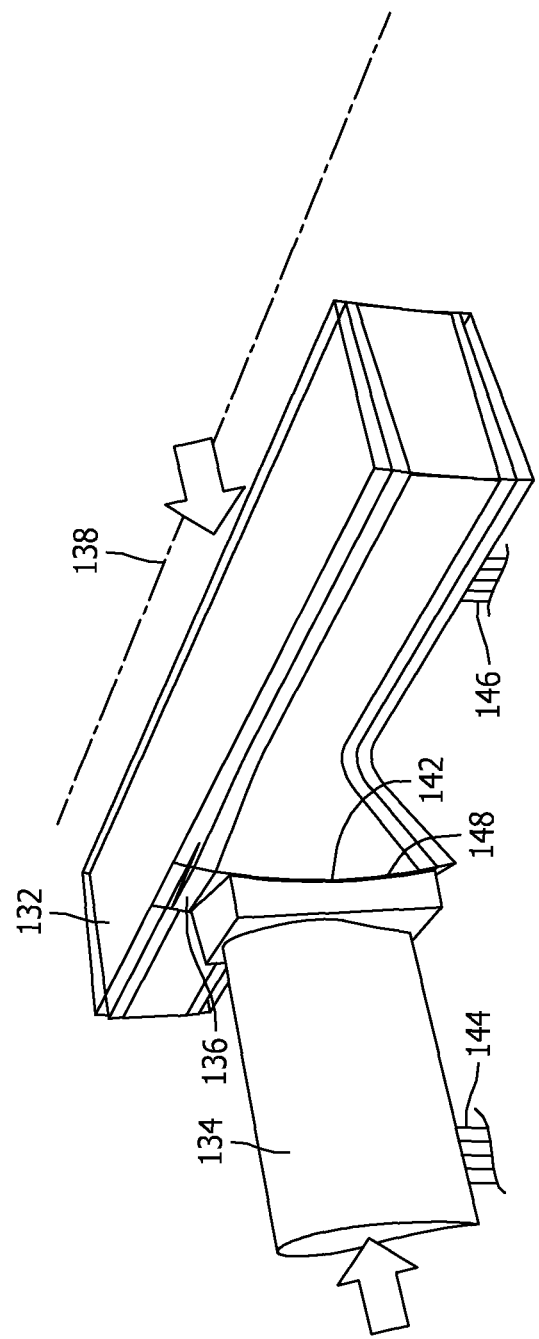
FIG. 12 is a representation similar to that of FIG. 11 from the opposite end of the workpiece.

The machine tool 146 holding the workpiece 132 is operated to angularly oscillate the workpiece weld surface 136 about the symmetry axis 138 as represented in FIGS. 9 and 10. The component part 134 is then moved by its supporting machine tool 144 in a translational movement toward the oscillating workpiece 132 held by its machine tool 146. Accordingly, the weld surface 136 is engaged in surface engagement and mated with the complementary surface 142 as represented in FIGS. 11 and 12. The weld surface 136 and the complementary surface 142 are urged together with a first predetermined force while maintaining the orientation of the component part 134 relative to the workpiece 132. In the example of FIGS. 11 and 12, this is accomplished by urging the component part 134 toward the workpiece 132 in a direction that is perpendicular to the axis 138. The force is directed through the axis 138 and the center of the interface between complementary surface 142 and the weld surface 136. The option is available for the complementary surface 142 of the component part 134 to have a configuration wherein the radius of curvature of the complementary surface 142 may be slightly less than that of the workpiece weld surface 136. This enables the initial surface contact between the complementary surface 142 and the weld surface 136 to occur in those regions of the weld surface where machine tool 144 is not applying a force directly perpendicular to the weld surface 136. The net result of this joint configuration is to compensate for any loss in surface contact pressure that would have existed as a result of any non-perpendicular applied force at the weld surface 136. This enables a uniform distribution of pressure across the engaging surfaces when the weld surface 136 and the complementary surface 142 are urged together with the first predetermined force. This also enables the plasticizing of all of the material on the engaging surfaces at the same time.

The component part complementary surface 142 may also feature a radius of curvature that is larger than that of the workpiece weld surface 136 if added control of flash material is desired, and uniform pressure distribution across the weld surface is less of a concern for certain materials. This joint configuration will cause the flash material to flow from the recessed portion of the component part complementary surface 142, which contacts the workpiece weld surface 136 first, toward the salient portions of the component part complementary surface 142, which are initially spaced from the workpiece weld surface 136.

If both uniform pressure distribution and control of flash material are desired, the further option exists for the component part complementary surface 142 to have the following features: the complementary surface 142 features a slightly smaller radius of curvature compared to that of the mating workpiece weld surface 136, providing added relative pressure along the regions of the mating surfaces distal to the recessed portion of the component part complementary surface 142 to create a uniform pressure distribution across the mating weld surfaces; and the component part complementary surface 142 features an outwardly tapered configuration (whether the component part 134 is a solid rod or a hollow tube), such that the flow of flash material is guided radially outward of the faying surfaces.

In view of the above, the axis of symmetry 138 of the virtual surface VS, at least a portion of which is coextensive with the workpiece weld surface 136, and an axis of symmetry of a virtual surface, at least a portion of which is coextensive with the component part complementary surface 142, may differ as features are added to the component part complementary surface 142 to correct for variations in contact pressure distribution or to control the flow of flash material. Therefore the component part complementary surface 142 conforming to the workpiece weld surface 136 should be understood to include the various joint configurations discussed above that are directed to uniform pressure distribution, flow control of flash material, or both.

Referring, e.g., to FIG. 12, the angular oscillations of the workpiece weld surface 136 against the component part complementary surface 142 generate heat and create a region of plasticized material 148 between the engaging surfaces. The angular oscillations of the workpiece 132 about the axis 138 occur at a predetermined angle of oscillation and at a predetermined frequency of oscillation. The angle through which the workpiece weld surface 136 is oscillated by the machine tool 146 is influenced by the size of the workpiece weld surface 136 and the size of the component part complementary surface 142. For example, for a cylindrical workpiece having a two-inch diameter, the arc defined by the angularly oscillating movement of the workpiece weld surface could be about 4 mm. Additionally, the frequency of the angular oscillations could range from about 15 Hz to about 100 Hz. Again, depending on the size and shape of the workpiece weld surface and the component part complementary surface, as well as other parameters similar to those used in linear friction welding, the oscillation angle and frequency of the workpiece are predetermined.

As the workpiece 132 oscillates at the predetermined oscillation angle and frequency, the workpiece 132 and the component part 134 are urged together at a first predetermined force for a first predetermined period of time until the entire weld surface 136 has reached the appropriate temperature for all material in the region of contact to become plasticized. The workpiece 132 and the component part 134 are then urged together at a second predetermined force, which is slightly higher than the first predetermined force, causing the component part 134 to translate toward the oscillating workpiece 132 for a second predetermined period of time, along a predetermined upset length (the upset length can be on the order of millimeters). During this phase, plasticized material will flow out of the periphery of the weld surface 136 and complementary surface 142 as flash material.

While the workpiece 132 and component part 134 are urged together, any upset plasticized material formed between the engaging workpiece weld surface 136 and component part complementary surface 142 is forced out from the welding interface of the two surfaces. At least one of the weld surface 136 and the complementary surface 142 includes a feature, such as those described above, that controls the flow of plasticized material.

Figure 13:
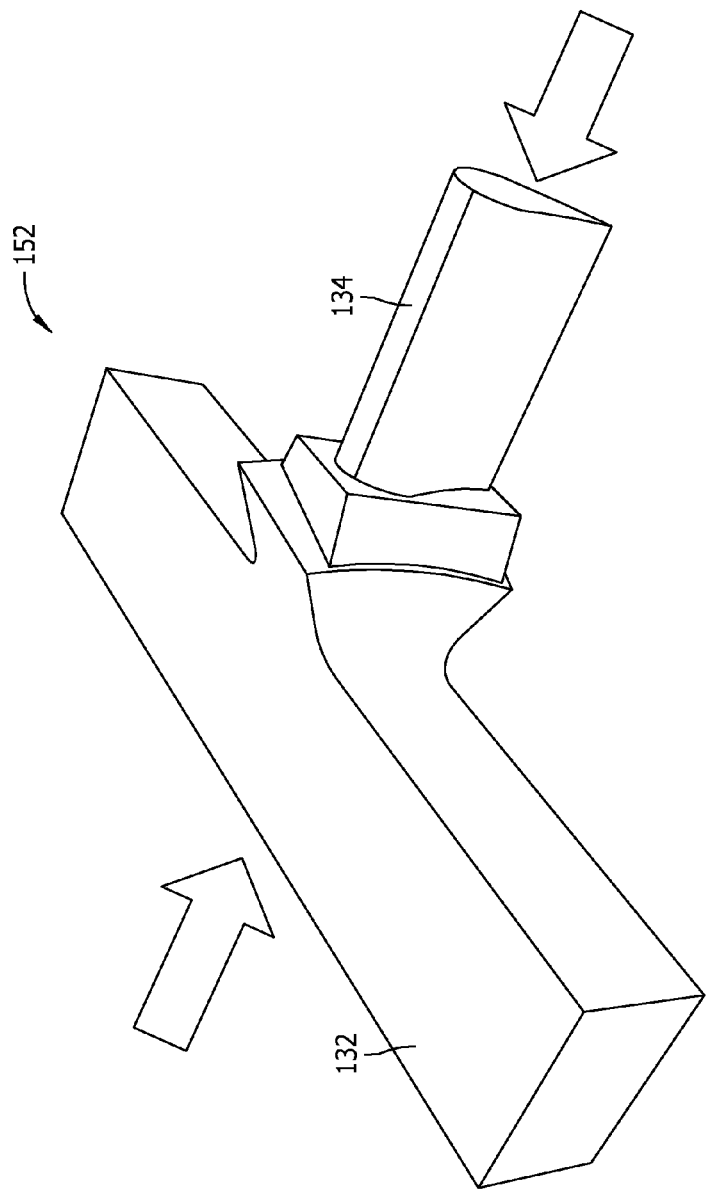
FIG. 13 is a representation of a still further step of the method following that of FIGS. 10 and 11.

The machine tool 146 holding the workpiece 132 is then operated to discontinue the angular oscillations of the workpiece weld surface 136 as represented in FIG. 13. The workpiece 132 and the component part 134 are then urged together at a third predetermined force for a third predetermined period of time to control the strength of the joint. This final phase is a forging phase, and, for maximum strength of the joint, the third predetermined force is higher than the first predetermined force and the second predetermined force. If the joint being formed is to be designed as a point of failure for the assembly (i.e., the weakest point of the assembly), the third predetermined force will differ depending on the desired strength of the finished joint. The third predetermined force is maintained as the plasticized material 148 cools and consolidates, thereby forming a unitary assembly 152 comprising the workpiece 132 and a component part 134.

After the plasticized material cools and consolidates, any excess plasticized material in the area of the weld 148 is removed and any post weld machining operations are performed The force urging together the weld surface 136 and the complementary surface 142 is then discontinued, completing the method of friction welding the component part 134 to the workpiece 132.

Figure 14:
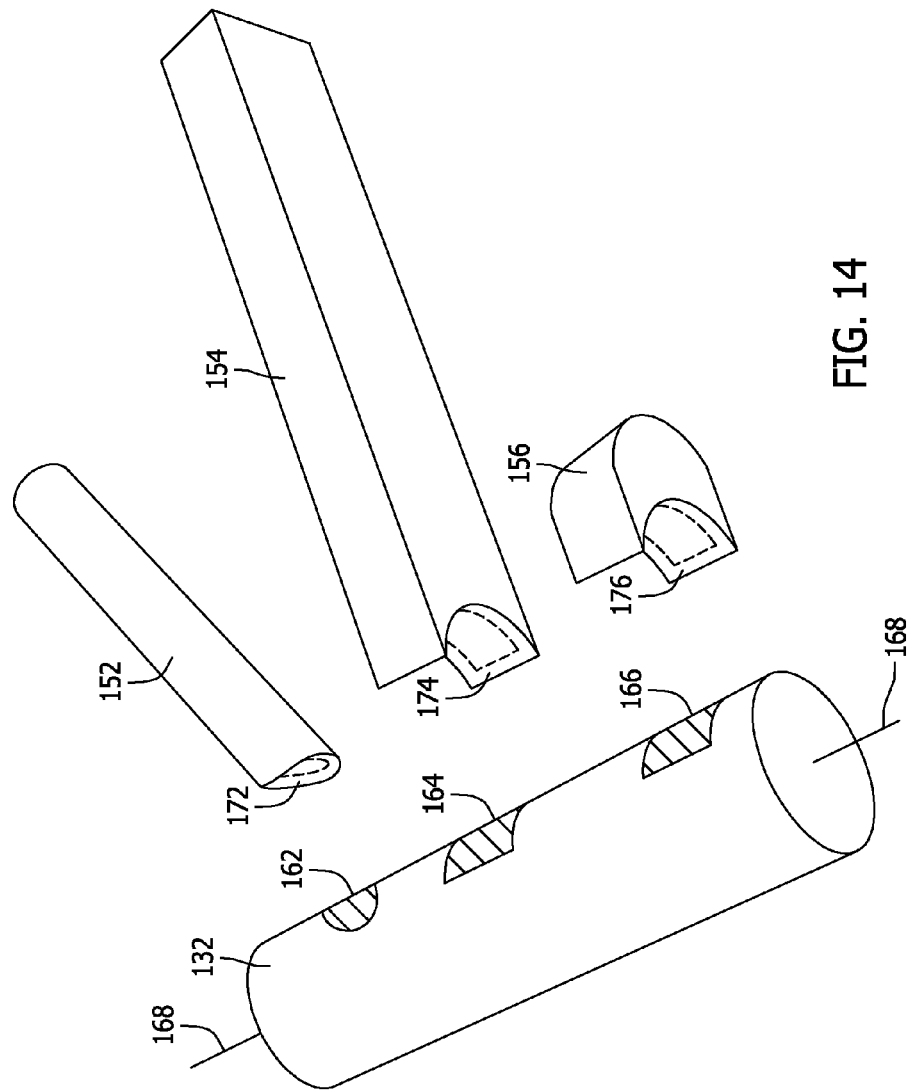
FIG. 14 is a representation of a further embodiment of the method of the invention. The dashed lines in FIG. 14 schematically represent openings which, in one aspect of the disclosure, may exist in the complementary surfaces of the component parts shown.

In other aspects, the weld surface could be one of a plurality of discreet weld surfaces already existing on the workpiece or post-formed on the workpiece for purposes of angular oscillation friction welding. FIG. 14 relates to an arrangement of the workpiece 132 and a plurality of component parts 152, 154, 156 where at least two of the plurality of component parts have different shapes. The method of angular oscillation friction welding is basically the same as that previously described.

The workpiece is provided with three discreet weld surfaces 162, 164, 166 on its exterior surface. If the workpiece 132 has a cylindrical outer surface, each of the weld surfaces 162, 164, 166 is coextensive with the cylindrical outer surface of the workpiece 123, which is symmetric about an axis 168. However, as mentioned previously, the entire exterior surface of the workpiece 132 need not be symmetric about the axis 168 (i.e., cylindrical). If the workpiece 132 is only partially cylindrical or if pre-weld machining operations on the weld surfaces of the workpiece are required, the weld surfaces may be coextensive with at least a portion of a virtual surface (not shown) that is symmetric about an axis.

Pre-weld machining operations may be performed on each of the component parts 152, 154, 156. As in the previously described example, the complementary surfaces 172, 174, 176 are shaped to conform to and fit in surface engagement with the discrete weld surfaces 162, 164, 166, respectively, of the workpiece. The complementary surfaces may also be surfaces already existing on the component parts. Additionally, as a result of features, optionally added to the complementary surfaces to promote uniform contact-pressure distribution and/or to control the flow of flash material, an axially symmetric surface or surfaces, at least partially coextensive with the component part complementary surfaces 172, 174, 176, may not share the same axis of symmetry with an axially symmetric surface which is at least partially coextensive with the workpiece weld surfaces 162, 164, 166.

After completion of the pre-weld machining operations, if any, on the workpiece 132 and the component parts 152, 154, 156, the workpiece and component parts are positioned relative to each other as shown in FIG. 14 in the angular orientations desired for the final assembly. The component parts 152, 154, 156 can be perpendicular to the axis 168 of the weld surfaces 162, 164. 166 or can be oblique relative to the axis. Different component parts may have different angular orientations relative to the axis 168. The workpiece 132 and the component parts 152, 154, 156 are held in these relative positions by machine tools as in the previously described example.

Figure 15:
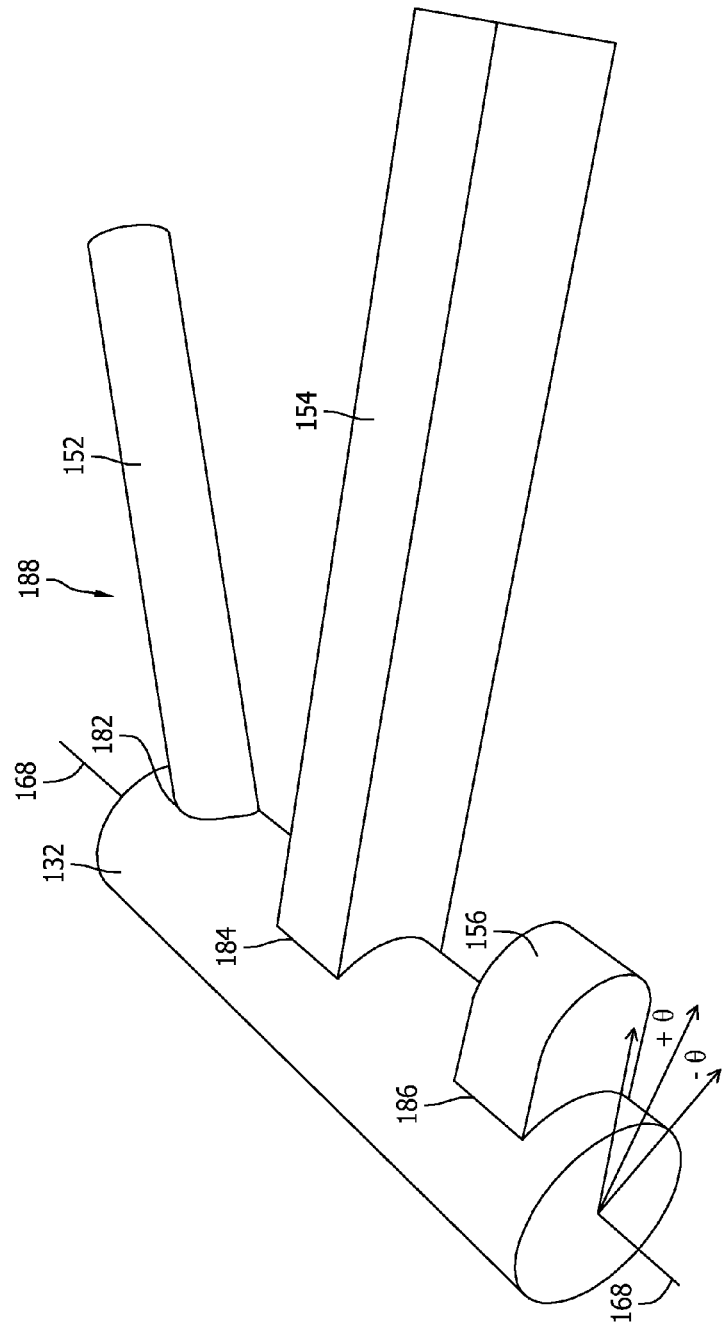
FIG. 15 is a representation of a method step following that of FIG. 14.

As represented in FIG. 15, the machine tool (not shown) holding the workpiece 132 is then operated to angularly oscillate the workpiece weld surfaces 162, 164, 166 about the symmetry axis 168 of a surface which is at least partially coextensive with the weld surfaces. The component parts 152, 154, 156 are then translated by their supporting machine tools toward the oscillating workpiece 132. The workpiece weld surfaces 162, 164, 166 are mated in surface engagement with the opposing component part complementary surfaces 172, 174, 176. The workpiece weld surfaces 162, 164, 166 and the opposing component part complementary surfaces 172, 174, 176 are urged together with a first predetermined force for a first predetermined time period while maintaining the orientation of the component parts 152, 154, 156 relative to the work piece 132. It should be appreciated that due to the different orientations between the component parts 152, 154, 156 and the workpiece 32 and due to the different shapes and areas of the engagement surfaces of the workpiece weld surfaces 162, 164, 166 and the corresponding component part complementary surfaces 172, 174, 176, that the forces urging the surfaces together could be different. Urging together a workpiece and a plurality of component parts could result in urging a complementary surface of one component part of the plurality of component parts against the weld surface with one predetermined force, and urging a complementary surface of another component part of the plurality of component parts against the weld surface with another predetermined force where the one predetermined force and the other predetermined force are not equal.

As the workpiece 132 is oscillated at the predetermined angle of oscillation and frequency, the workpiece 132 and the component parts 152, 154, 156 are urged together with a first predetermined force for the first predetermined period of time until the entirety of each weld surface 162, 164, 166 and each corresponding complementary surface 172, 174, and 176 has reached the appropriate temperature for all material in the region of contact to become plasticized. The workpiece 132 and the component parts 152, 154, 156 are then urged together at a slightly higher second predetermined force, causing the component parts to translate toward the oscillating workpiece for a second period of time, along a predetermined upset length (usually on the order of millimeters). During this phase, a plasticized material 182, 184, 186 will flow out of the periphery of the weld surfaces 162, 164, 166 and corresponding complementary surfaces 172, 174, 176 as flash material.

The machine tool holding the workpiece 132 is then operated to discontinue the angular oscillations of the workpiece 132. The workpiece 132 and the component parts 152, 154, 156 are then urged together at a third predetermined force for a third predetermined period of time to control the strength of the joints. This final phase is a forging phase, and, for maximum strength of the joints, the third predetermined force is higher than the first predetermined force and the second predetermined force. If the joints being formed are to be designed as points of failure for the assembly (i.e., the weakest points of the assembly), the third predetermined force will differ depending on the desired strength of the finished joint. The third predetermined force is maintained as the plasticized material 182, 184, 186 cools and consolidates, thereby forming a unitary assembly 188 comprising the workpiece 132 and the component parts 152, 154, 156.

After the plasticized material cools and consolidates, any excess plasticized material in the area of the friction welds 182, 184, 186 is removed as necessary and any post weld machining operations are performed. The application of force urging together the weld surfaces 162, 164, 166 and the complementary surfaces 172, 174, 176 is then discontinued, completing the method of friction welding the component parts to the workpiece.

FIG. 16 and FIG. 17 further demonstrate that the inventive method may be employed in friction welding a workpiece 192 that does not have an exterior surface that is symmetric around an axis, but is provided with discreet weld surfaces 194, 196 that are coextensive with a portion of a surface symmetric about an axis. Additionally, the component part 198 to be welded to the workpiece 192 need not have a single complementary surface that corresponds to the weld surface of the workpiece, but could have a plurality of discreet complementary surfaces 202, 204 that correspond to the weld surfaces 194, 196 of the workpiece 192.

FIGS. 18-21 depict how the method, according to one or more aspects of the disclosure, can be practiced on a variety of workpieces having a geometric variation along the axis of oscillation thereof. This geometric variation may occur on at least a portion of the weld surface of the workpiece.

Figure 18:
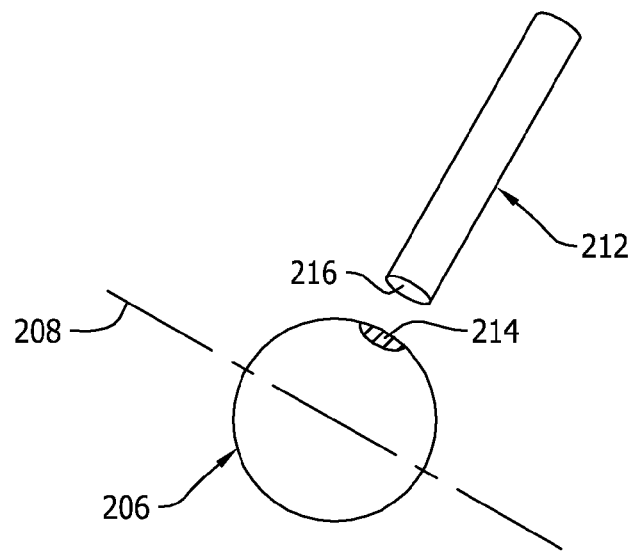
FIG. 18 is a representation of the method of the invention practiced on a spherically shaped workpiece and a cylindrical component part.

FIG. 18 illustrates the method, according to one aspect of the disclosure, practiced on a spherical workpiece 206 having a symmetry axis 208, and a generally cylindrical component part 212. The workpiece 206 has a weld surface 214 that is coextensive with a portion of the spherical surface of the workpiece 206, symmetric about the axis 208. The component part 212 has a complementary surface 216, which mates with the weld surface 214.

The steps of this aspect of the method are essentially the same as those described above. The weld surface is oscillated about its symmetry axis 208 and the component part complementary surface 216 is mated with the workpiece weld surface 214. The component part complementary surface 216 can be urged into engagement with the weld surface 214 by a force directed along a line that is perpendicular to the symmetry axis, or oblique thereto.

Figure 19:
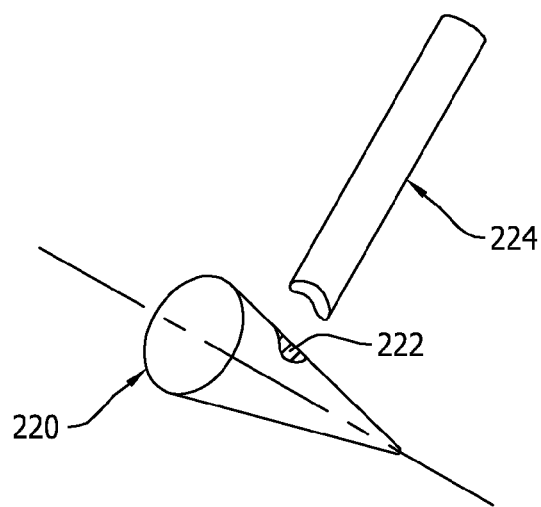
FIG. 19 is a representation of the method according to one aspect of the disclosure practiced on a conically shaped workpiece and a cylindrical component part.

FIG. 19 illustrates a workpiece 220 having a conical configuration and a weld surface 222 on its exterior, and a component part 224 having a general cylindrical configuration. The weld surface 222 is coextensive with a portion of the conical surface of the workpiece 220, symmetric about the axis of oscillation of the workpiece 220.

Figure 20:
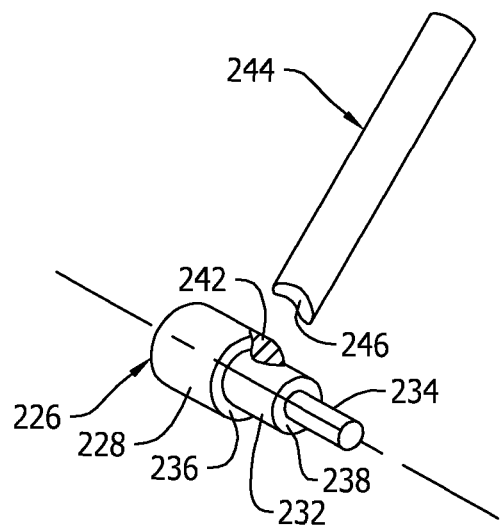
FIG. 20 is a representation of the method according to one aspect of the disclosure practiced on a generally cylindrical workpiece and a cylindrical component part where the workpiece has a plurality of different cylindrical surface sections with adjacent cylindrical surface sections being separated by annular surface sections.

FIG. 20 shows a workpiece 226 having a plurality of cylindrical exterior surface sections 228, 232, 234 that are separated by annular exterior surface sections 236, 238. The weld surface 242 overlaps portions of two of the cylindrical exterior surface sections 222, 232. The component part 244 has a complementary surface 246, which mates with portions of the weld surface 242 on each of the cylindrical exterior surface sections. The weld surface 242 is coextensive with a portion of the cylindrical exterior surface sections 228 and 232, which are symmetric about the axis of oscillation of the workpiece 226.

Figure 21:
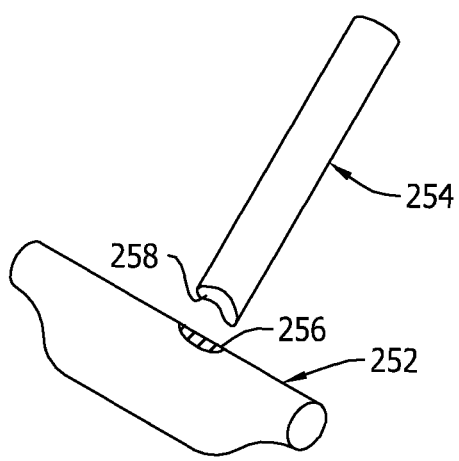
FIG. 21 is a representation of the method according to one aspect of the disclosure practiced on a workpiece having an exterior surface that does not have a center axis and a cylindrical component part.
Figure 22:
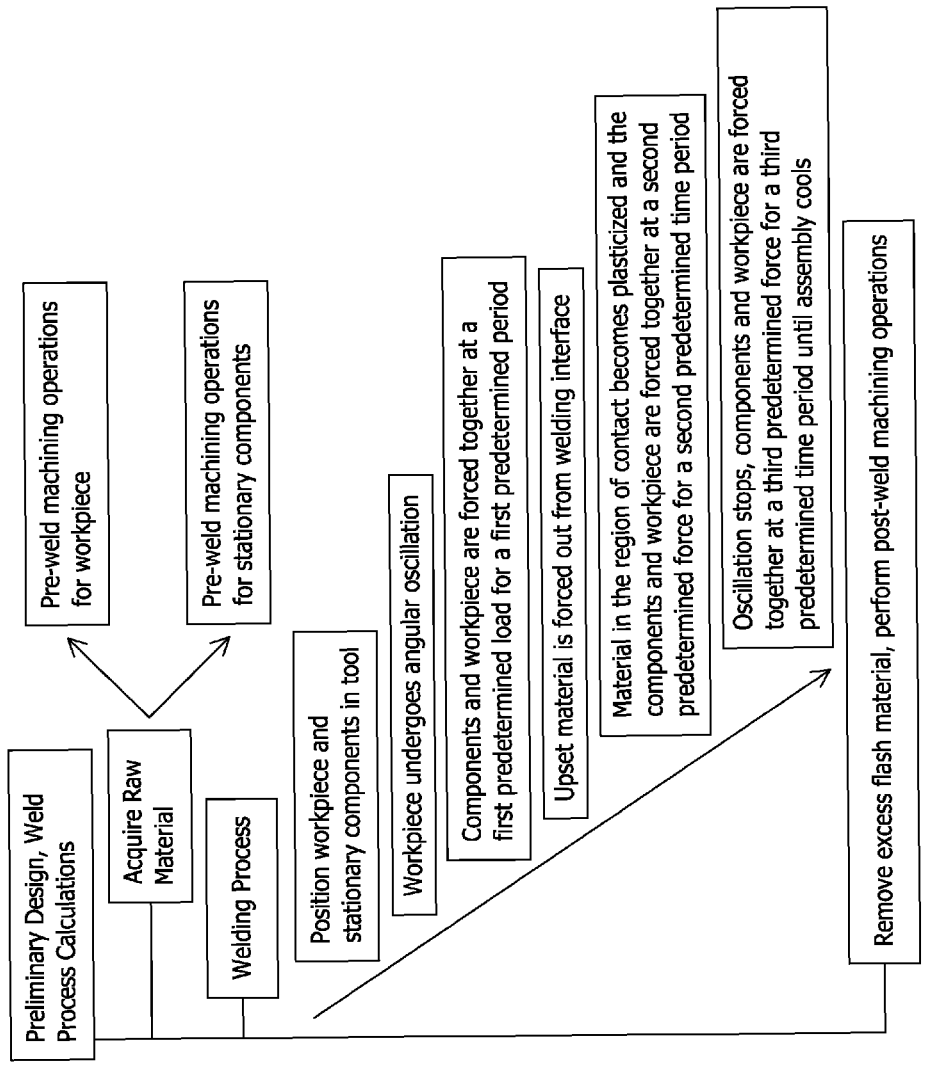
FIG. 22 is a flow chart representing the general sequence of steps involved in the method according to one aspect of the disclosure.

FIG. 21 illustrates a workpiece 252 having an exterior surface that does not have a symmetry axis, and a component part 254 that is generally cylindrical. The workpiece 252 has a weld surface 256 that is coextensive with a portion of a virtual surface, which is symmetric about an axis of oscillation of the workpiece 252, even though the exterior surface of the workpiece 252 does not have an axis of symmetry. The weld surface is oscillated and the component part 254 complementary surface 258 mates with the weld surface 256, as described earlier.

As various modifications of the aspects of the disclosure could be described and illustrated without departing from the scope thereof, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A method of joining, the method comprising:
providing a workpiece including a weld surface that is coextensive with at least a portion of a virtual surface that is symmetric about an axis, the workpiece having an exterior surface that is not symmetric about the axis, the weld surface being a part of the exterior surface;
providing at least one component part with a complementary surface that conforms to the weld surface;
angularly oscillating the weld surface about the axis;
urging the weld surface and the complementary surface together with a first predetermined force for a first predetermined time to create a region of a plasticized material between the workpiece and the at least one component part;
urging the weld surface and the complementary surface together with a second predetermined force for a second predetermined time, wherein the second predetermined force is greater than the first predetermined force;
discontinuing angularly oscillating the weld surface;
urging the weld surface and the complementary surface together with a third predetermined force for a third predetermined time; and,
discontinuing to urge the weld surface and the complementary surface together when the plasticized material consolidates and the workpiece and the at least one component part coalesce.

2. The method of claim 1, wherein:
the urging of the weld surface and the complementary surface together is achieved by urging the at least one component part toward the workpiece.

3. The method of claim 1, wherein:
the shape of the weld surface of the workpiece changes along the axis.

4. The method of claim 1, wherein:
the workpiece includes a cross-section intersecting the weld surface, wherein the cross-section is asymmetric about the axis.

5. The method of claim 1, wherein:
angularly oscillating the workpiece about the axis occurs at a predetermined angle of oscillation and at a predetermined frequency of oscillation.

6. The method of claim 1, wherein:
the at least one component part is perpendicular to the axis.

7. The method of claim 1, wherein:
the at least one component part is oblique relative to the axis.

8. A method of joining, the method comprising:
providing a workpiece including a weld surface that is coextensive with at least a portion of a virtual surface that is symmetric about an axis and has a first radius of curvature relative to the axis, the workpiece having an exterior surface that is not symmetric about the axis, the weld surface being part of the exterior surface;
providing at least one component part including a complementary surface that conforms to the weld surface, the complementary surface having a second radius of curvature;
angularly oscillating the weld surface about the axis;
urging the weld surface and the complementary surface together with a first predetermined force for a first predetermined time to create a region of a plasticized material between the workpiece weld surface and the at least one component part complementary surface;
at least one of the weld surface and the complementary surface includes a feature that controls a flow of the plasticized material wherein the first radius of curvature and the second radius of curvature are different.

9. The method of claim 1, wherein:
the weld surface is one of a plurality of discreet weld surfaces.

10. The method of claim 1, wherein:
the complementary surface is one of a plurality of discreet complementary surfaces.

11. The method of claim 1, wherein:
the workpiece has a longitudinal length and a lateral width, and wherein the axis extends generally longitudinally relative to the workpiece.

12. The method of claim 1, wherein:
the workpiece has a longitudinal length and a lateral width, and wherein the axis extends generally laterally relative to the workpiece.

13. The method of claim 1, wherein:
the at least one component part is one of a plurality of component parts.

14. The method of claim 13, wherein:
at least two of the plurality of component parts include complementary surfaces having different shapes.

15. The method of claim 13, further comprising:
urging a complementary surface of one component part of the plurality of component parts against the weld surface with one predetermined force; and, urging a complementary surface of another component part of the plurality of component parts against the weld surface with another predetermined force.

16. The method claim 15, wherein:
the one predetermined force and another predetermined force are unequal.

17. The method of claim 1, wherein:
the component part is hollow; and
the complementary surface contains an opening.

18. The method of claim 1, wherein:
the complementary surface contains no enclosed opening.

19. A method of joining, the method comprising:
providing a workpiece including at least one weld surface that is coextensive with at least a portion of a virtual surface that is symmetric about an axis, the workpiece having an exterior surface that is not symmetric about the axis, the at least one weld surface being a part of the exterior surface;
providing a plurality of component parts including complementary surfaces that conform to the at least one weld surface;
angularly oscillating the at least one weld surface about the axis;
urging the at least one weld surface and the complementary surfaces together with a first predetermined force for a first predetermined time to create regions of a plasticized material between the workpiece and the plurality of component parts, with proportions of the first predetermined force on at least two complementary surfaces being different;
urging the at least one weld surface and the complementary surfaces together with a second predetermined force for a second predetermined time, wherein the second predetermined force is greater than the first predetermined force and with proportions of the second predetermined force on at least two complementary surfaces being different;
discontinuing angularly oscillating the at least one weld surface;
urging the at least one weld surface and the complementary surfaces together with a third predetermined force for a third predetermined time, with proportions of the third predetermined force on at least two complementary surfaces being different; and,
discontinuing to urge the at least one weld surface and the complementary surfaces together when the plasticized material consolidates and the workpiece and the plurality of component parts coalesce.

20. The method of claim 8, wherein:
the second radius of curvature is larger than the first radius of curvature.

21. The method of claim 8, wherein:
the first radius of curvature is larger than the second radius of curvature.

22. The method of claim 21, wherein:
the complementary surface has an outwardly tapered configuration.

\* \* \* \* \*